United States Patent [19]

Sabourin et al.

[11] Patent Number: 5,903,545
[45] Date of Patent: May 11, 1999

[54] RESPONSIVE ROUTING CONTROL METHOD AND APPARATUS

[75] Inventors: Donald John Sabourin, Mesa; Jeffrey Stuart Dorin, Chandler; Henry Joseph Happ, III, Gilbert, all of Ariz.

[73] Assignee: Motorola, Inc., Schaumburg, Ill.

[21] Appl. No.: 08/801,334

[22] Filed: Feb. 19, 1997

Related U.S. Application Data

[63] Continuation of application No. 08/426,999, Apr. 24, 1995, abandoned.

[51] Int. Cl.$^6$ ...................................................... H04J 3/14
[52] U.S. Cl. .............................................................. 370/225
[58] Field of Search ..................................... 370/351, 216, 370/217, 218, 219, 220, 221, 222, 223, 224, 225, 226, 227, 228, 242, 244, 249, 250, 389, 392, 422, 426, 522

[56] References Cited

U.S. PATENT DOCUMENTS

| | | |
|---|---|---|
| 5,253,248 | 10/1993 | Dravida et al. . |
| 5,265,092 | 11/1993 | Soloway et al. . |
| 5,319,632 | 6/1994 | Iwasaki ....................................... 370/16 |
| 5,398,236 | 3/1995 | Hermmady et al. ....................... 370/16 |
| 5,412,376 | 5/1995 | Chujo et al. ............................... 370/16 |
| 5,452,286 | 9/1995 | Kitayama ................................... 370/16 |
| 5,459,716 | 10/1995 | Fahim et al. .............................. 370/16 |
| 5,473,598 | 12/1995 | Takatori et al. ........................... 370/16 |
| 5,495,471 | 2/1996 | Chow et al. ............................... 370/16 |

FOREIGN PATENT DOCUMENTS

| | | |
|---|---|---|
| 0563572 | 10/1993 | European Pat. Off. . |
| 2019166 | 10/1979 | United Kingdom . |
| 9216066 | 9/1992 | WIPO . |

OTHER PUBLICATIONS

Computer Networks and ISDN Systems, vol. 12, No. 3, J.M. Jaffee, et al., "Subtle Design Issues in the Implementation of Distributed, Dynamic Routing Algorithms", (1986).

A. S. Tanenbaum, "Computer Networks", pp. 294–295, Prentice–Hall International (1988).

Globecom '90, vol. 2, A. Bellary et al., "Intelligent Transport Network, Survivability: Study of Distributed and Centralized Control Techniques Using DCS & ADMs", pp. 1264–1268, (Dec., 1990).

*Primary Examiner*—Huy D. Vu
*Attorney, Agent, or Firm*—Sherry J. Whitney; Frank J. Bogacz

[57] ABSTRACT

A method and apparatus for controlling routing within a communication system (10) modifies (258) routing tables (220, 230, 232, 234, 236) located within nodes (150) so that received data packets are not returned directly to their sending nodes. In response to detection (352) of a failed link, a node (150) modifies (354) its routing tables (220, 230, 232, 234, 236) to avoid the failed link. After notification (402) of the failed link, a control facility (28) responds by creating (404) commands that compensate for the failed link. The control facility (28) sends (404) the commands to at least the node (150) that detected the failed link. If not already performed by the control facility (28), the node (150) then modifies (364, 366) its routing tables (220, 230, 232, 234, 236) so that data packets are not returned to their sending nodes, and to avoid the failed link.

12 Claims, 7 Drawing Sheets

| DN-ID | FORE | AFT | LEFT | RIGHT | ALT-1 | ALT-2 |
|---|---|---|---|---|---|---|
| 1 | L | L | L | L | L | A |
| 2 | R | R | R | R | L | A |
| 3 | F | F | F | F | L | A |
| 4 | A | A | A | A | L | A |
| 5 | L | L | L | L | L | A |
| 6 | F | F | F | F | L | A |
| 7 | L | L | L | L | F | R |
| 8 | L | L | L | L | F | R |
| 9 | A | A | A | A | F | R |
| 10 | F | F | F | F | F | R |
| 11 | R | R | R | R | F | R |
| 12 | A | A | A | A | F | R |

| DN-ID | FORE | AFT | LEFT | RIGHT | ALT-1 | ALT-2 |
|---|---|---|---|---|---|---|
| 1 | L | L | A | L | L | A |
| 2 | R | R | R | L | L | A |
| 3 | L | F | F | F | L | A |
| 4 | A | L | A | A | L | A |
| 5 | L | L | A | L | L | A |
| 6 | L | F | F | F | L | A |
| 7 | L | L | F | L | F | R |
| 8 | L | L | F | L | F | R |
| 9 | A | F | A | A | F | R |
| 10 | R | F | F | F | F | R |
| 11 | R | R | R | F | F | R |
| 12 | A | F | A | A | F | R |

| DN-ID | FORE | AFT | LEFT | RIGHT | ALT-1 | ALT-2 |
|---|---|---|---|---|---|---|
| 1 | X | L | A | L | L | A |
| 2 | X | R | R | L | L | A |
| 3 | X | L | L | L | L | A |
| 4 | X | L | A | A | L | A |
| 5 | X | L | A | L | L | A |
| 6 | X | L | L | L | L | A |
| 7 | X | L | R | L | F | R |
| 8 | X | L | R | L | F | R |
| 9 | X | R | A | A | F | R |
| 10 | X | R | R | R | F | R |
| 11 | X | R | R | R | F | R |
| 12 | X | R | A | A | F | R |

RESPONSIVE ROUTING CONTROL METHOD AND APPARATUS

This application is a continuation of prior application Ser. No. 08/426,999, filed on Apr. 24, 1995 now abandoned.

FIELD OF THE INVENTION

The present invention relates generally to routing communication data through a network, and more particularly to adjusting routing based on network link failures or other anomalies.

BACKGROUND OF THE INVENTION

In a communication system having multiple routing nodes that communicate with each other over links, a message intended to be transmitted from a source terminal to a destination terminal is routed through the system using routing tables stored in each node. Occasionally, a communication link used by a node may become incapable of sustaining communication messages. Such a link is referred to as a "failed link" and a node supporting a failed link is referred to as a "failed-link node". Although a failed link may occur due to some unforeseen event, a planned link outage may also constitute a failed link for the purposes of this description.

A failed link may have substantial consequences to the quality of service provided by the communication system. If the failed-link node continues routing as though the link did not fail (i.e., the failed-link node attempts to transmit messages across the failed link), dropped data packets and, ultimately, dropped calls will result.

In one method of avoiding dropped packets, a failed-link node modifies its own routing tables to override the current routing scheme. The failed-link node redistributes the packets to operable links (i.e., alternate routes). The failed-link node may, for example, send the data packets back to a node that originally transmitted the data packets (referred to herein as a "sending node"). Under this scheme of rerouting, a condition referred to as "continuous recirculation" may result. After receiving the data packet, the sending node may again attempt to route the data packet through the failed-link node. The failed-link node sends the data packet back to the sending node, and recirculation of the data packet may continue until the packet is dropped. The failed-link node cannot solve the dropped packets condition in isolation from its neighboring nodes.

What is needed is a method and apparatus to minimize the number of dropped packets by responding to the failed link in a rapid manner. What is further needed is a method and apparatus to prevent continuous recirculation within the system, thus maintaining connections when a link failure occurs.

BRIEF DESCRIPTION OF THE DRAWINGS

FIG. 7 exemplifies a consolidated port routing table after modification to avoid potential U-turn conditions in accordance with a preferred embodiment of the present invention;

FIG. 9 exemplifies a consolidated port routing table after modification to respond to a failed link in accordance with a preferred embodiment of the present invention.

DETAILED DESCRIPTION OF THE DRAWINGS

The present invention provides a method and apparatus to minimize a number of dropped data packets by responding to a failed link in a rapid manner. Further provided is a method and apparatus to prevent continuous recirculation of data packets.

Figure 1:
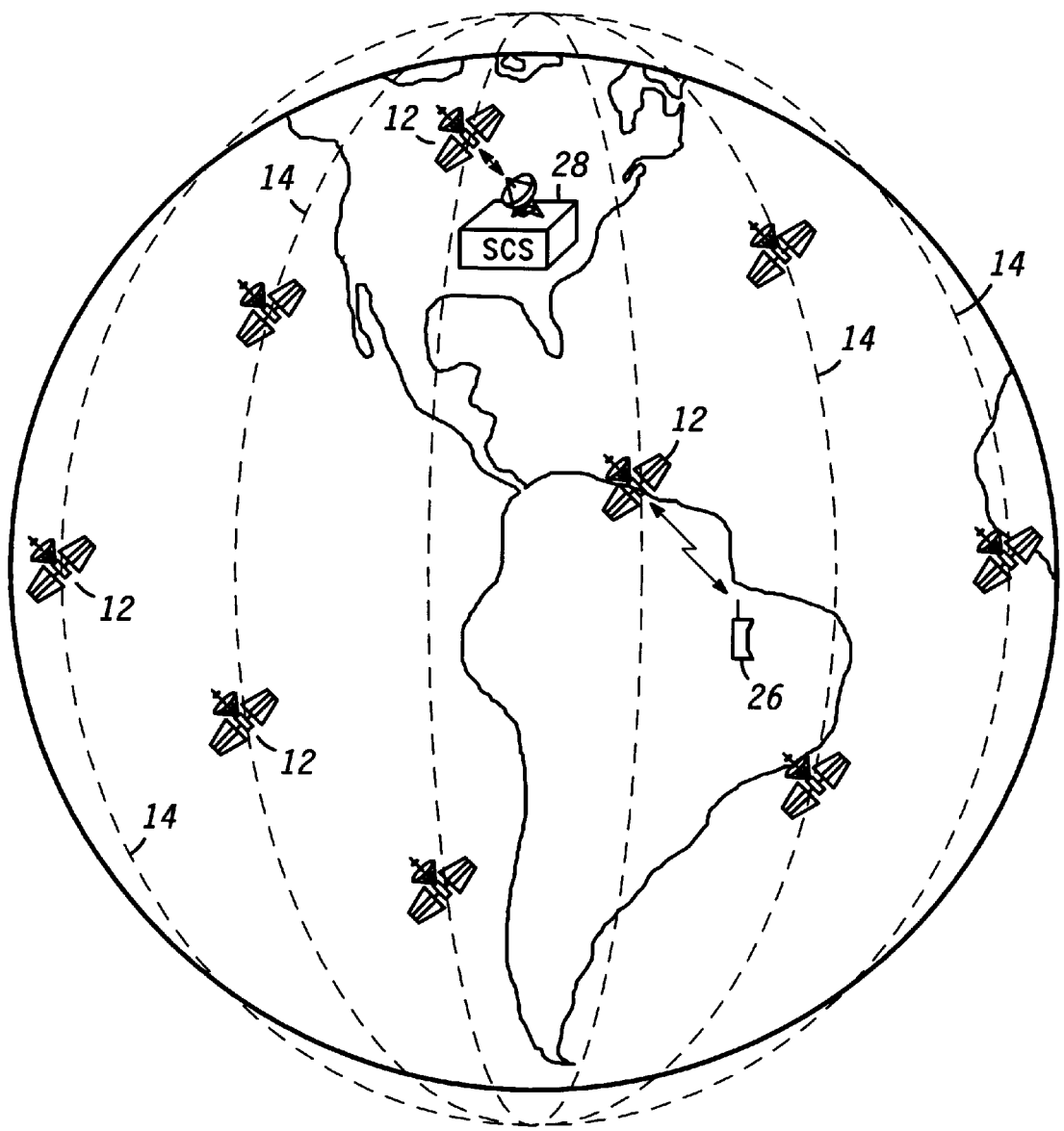
FIG. 1 illustrates a multi-nodal communication system in accordance with a preferred embodiment of the present invention.

FIG. 1 illustrates a multi-nodal communication system in accordance with a preferred embodiment of the present invention. Communications system 10 is dispersed over, and surrounds the earth through the use of orbiting satellites 12. Satellites 12 occupy orbits 14 that may be low-earth orbits, medium-earth orbits, geosynchronous orbits, or a combination thereof. Low-earth orbits occur generally at an altitude of approximately 600 km to 2000 km, medium-earth orbits occur at approximately 2000 km to 20,000 km, and geosynchronous orbits occur at approximately 42,165 km, but other altitudes may also be used. In the example shown, communications system 10 uses six polar orbital planes, with each orbital plane holding eleven satellites 12 for a total of sixty-six satellites 12. However, sixty-six satellites 12 are not essential, and more or fewer satellites 12, or more or fewer orbital planes, or combinations of orbiting, and geosynchronous satellites, may be used. For clarity, FIG. 1 illustrates only a few of satellites 12.

Satellites 12 operate as routing nodes for communication system 10, and communicate with terrestrial equipment which may be any number of radio communication Subscriber Units 26, a System Control Station 28 or other communication devices. Satellites 12 also communicate with other satellites 12 over "cross links".

Each satellite 12 desirably has at least one resident routing table which it updates using update commands or new routing tables received from System Control Station 28. In a preferred embodiment, a satellite 12 modifies its routing tables to prevent U-turn conditions (described below) and upon detection of a failed link. In alternate embodiments, some or all of these functions may be performed by System Control Station 28. After detecting a failed link, a satellite 12 desirably sends a failed link message to SCS 28. Functionality of satellites 12 is described in detail in conjunction with FIGS. 2–10.

A Subscriber Unit 26 (SU) shown in FIG. 1 is a communication terminal. An SU 26 may be, for example, a handheld, portable cellular telephone adapted to transmit data to, and receive data from satellites 12. An SU 26 may also be a facsimile device, pager, data terminal or any other type of communication device. Hard-wired telephony units (not shown) may also serve as communication terminals in communication system 10. These units may communicate with the satellite network using intermediate "gateways" (not shown). Gateways are equipment facilities, typically ground-based, that are capable of interfacing satellites 12 with ground-based equipment such as, for example, a public switched telephone network (PSTN) (not shown).

A "System Control Station" 28 (SCS) is a control facility, typically ground-based, which controls some operations of communication system 10. SCS 28 may communicate directly with the satellites 12, or may communicate via remote or co-located ground stations (not shown).

In a preferred embodiment, SCS 28 creates routing update commands and sends them to satellites 12. Satellites 12 use these update commands to modify their resident routing tables. SCS 28 also receives notification of a failed link and creates and sends new update commands to compensate for the failed link. In an alternate embodiment, SCS 28 performs additional functions, such as modifying update commands to prevent U-turn conditions. The functionality of SCS 28 in a preferred embodiment is described in detail in conjunction with FIG. 10.

Only one of SCS 28 and SU 26 are shown in FIG. 1 for clarity and ease of understanding. Those of skill in the art will understand based on the description that additional system facilities may be desirable, depending upon the requirements of the communication system.

Figure 2:
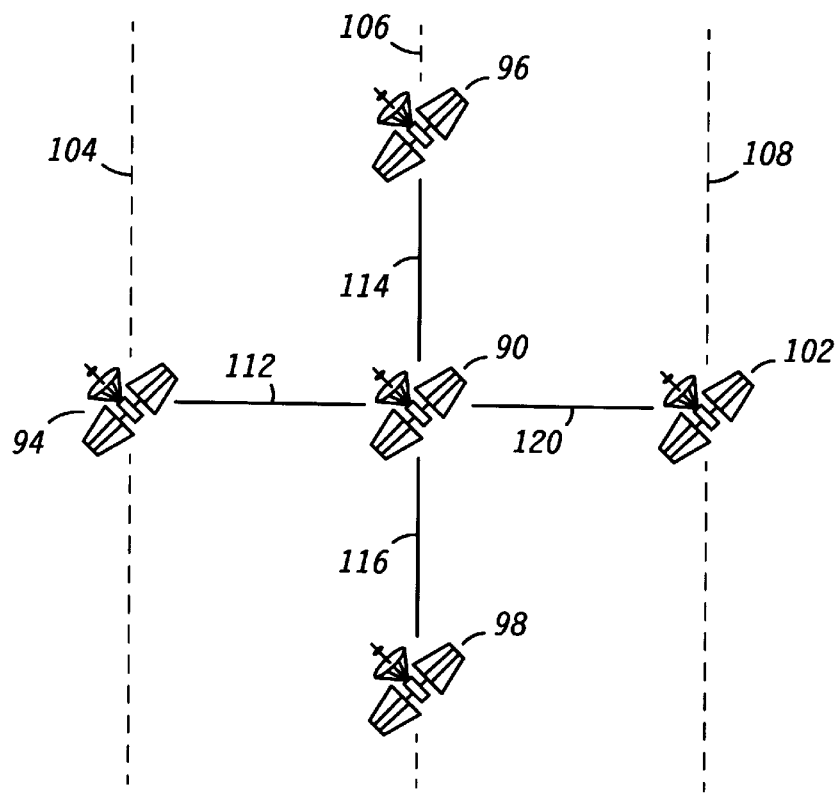
FIG. 2 illustrates multiple nodes and communication links between the nodes in accordance with a preferred embodiment of the present invention.

FIG. 2 illustrates multiple routing nodes and communication links between the nodes in accordance with a preferred embodiment of the present invention. As used herein, a "cross-link" is a communication link between two nodes. Satellites 90, 94, 96, 98, 102 are routing nodes that travel in orbital paths 104, 106, 108 and send data packets to each other over cross-links 112, 114, 116, 120. Satellites 90, 94, 96, 98, 102 in different orbital paths 104, 106, 108 may travel in the same or different orbital directions. In a preferred embodiment, links 112, 114, 116, 120 are bi-directional radio frequency (RF) links. However, it would be obvious to one of skill in the art based on the description that other types of transmission links may also be used (e.g., laser links). Satellites 90, 96, 98 travel in the same orbital path 106. Satellite 90 follows satellite 96 in orbital path 106. Therefore, with respect to satellite 90, satellite 96 is in the "fore" direction, satellite 98 is "aft", satellite 94 is "left", and satellite 102 is "right" (abbreviated herein as "F", "A", "L", and "R", respectively). A node such as satellite 90 may send and receive data over the left 112, right 120, fore 114, or aft 116 communication links. As used herein, a "cross-link port" or "port" designates the communication apparatus associated with a cross-link direction (fore, left, aft, or right). Therefore, the aft port of satellite 96 communicates with the fore port of satellite 90 over link 114. Although a preferred embodiment shows a satellite 90 communicating with four neighboring satellites 94, 96, 98, 102, it would be obvious to one of skill in the art based on the description that more or fewer neighboring satellites 12 may be used.

Resident within each satellite (or "node") is at least one routing table, which instructs the node as to which communication link to send data packets over. By correlating information contained within a data packet to the routing table, the node may determine over which link to transmit the data packet. As used herein, a Destination Node Identifier ("DN-ID") is desirably associated with each destination device for a data packet. For example, each satellite and ground station of the system of FIG. 1 may have a unique DN-ID. Any number of DN-IDs may be used, depending on the number and types of devices considered destinations for a particular system. Each data packet contains a DN-ID which a routing node uses to determine where to route the data packet. When the node correlates the DN-ID with the node's routing tables, the routing tables indicate to the node over which link to send the data packet.

Figure 3:
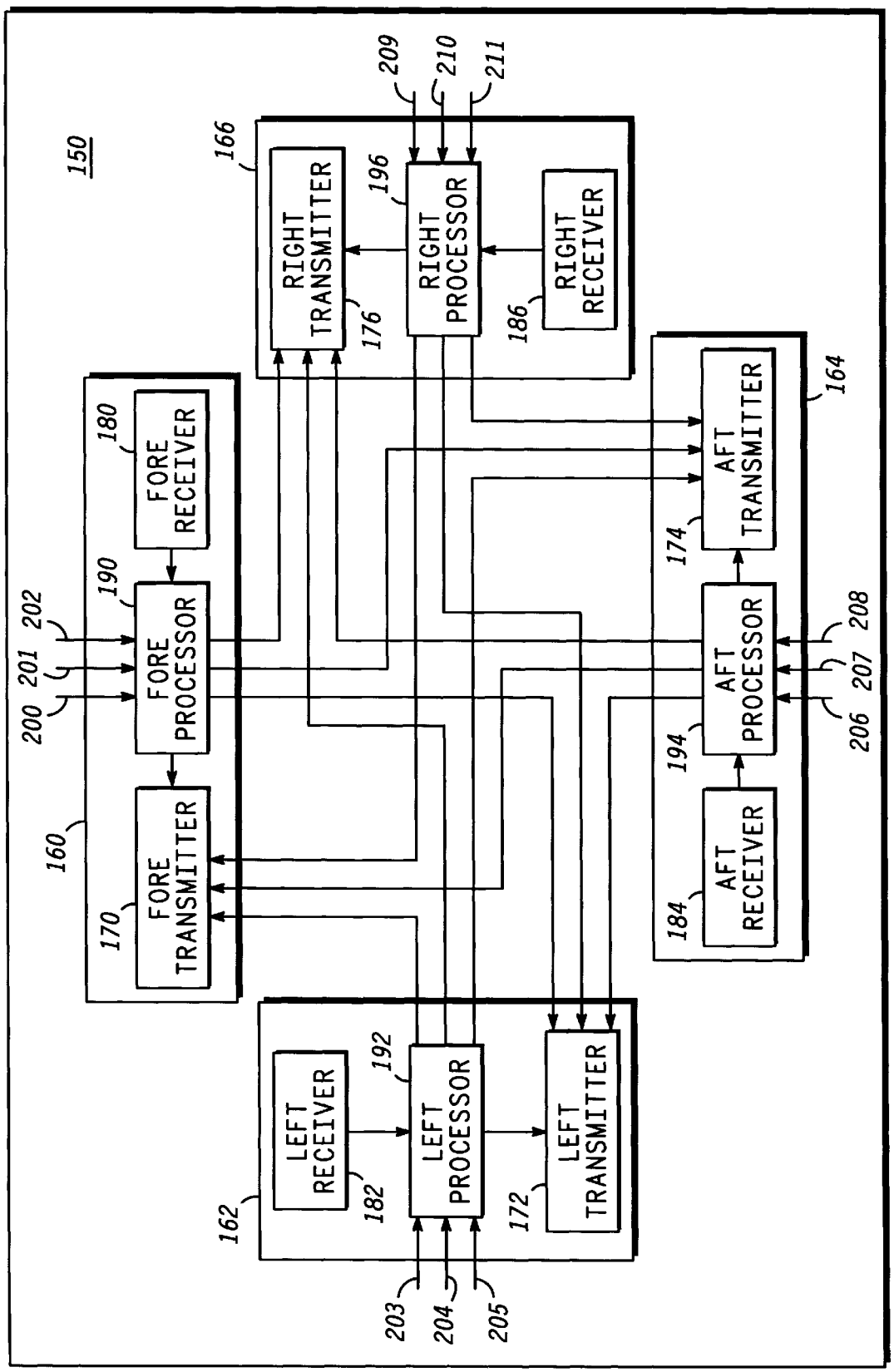
FIG. 3 illustrates a communication node in accordance with a preferred embodiment of the present invention.

FIG. 3 illustrates a communication node 150 in accordance with a preferred embodiment of the present invention. Communication node 150 may be, for example, a satellite such as those described in conjunction with FIG. 1. It is obvious to one of skill in the art based on the description, however, that other communication devices may also be employed as a communication node (e.g., ground-based routing devices).

In a preferred embodiment, communication node 150 has a "port computer" associated with each cross-link port: fore computer 160, left computer 162, aft computer 164, and right computer 166. It is obvious to one of skill in the art based on the description that more or fewer computers may exist on board a communication node. In a preferred embodiment, the number of computers is at least the number of cross-links that are supported by the node. FIG. 3 is a simplified representation of a communication node which illustrates only the computers used for cross-links. In an alternate embodiment, a single computer may be used to perform all routing functions, and each node computer may contain only a transmitting device 170, 172, 174, 176 and a receiving device 180, 182, 184, 186.

In a preferred embodiment, each port computer 160, 162, 164, 166 has a transmitting device 170, 172, 174, 176, a receiving device 180, 182, 184, 186, and a processor 190, 192, 194, 196 which couples the transmitting device 170, 172, 174, 176 and the receiving device 180, 182, 184, 186. It would be obvious to one of skill in the art based on the description that transmitting devices 170, 172, 174, 176 and receiving devices 180, 182, 184, 186 may support RF, optical, or electrical communications. As used herein, each transmitting device, receiving device, and processor is associated with its respective port by using the terms "fore", "left", "aft", and "right" in conjunction with the device.

Each processor 190, 192, 194, 196 is coupled to its associated receiving device 180, 182, 184, 186. In a preferred embodiment, each receiving device 180, 182, 184, 186 is primarily dedicated to receiving data packets ("incoming data packets") from cross-links. In alternate embodiments, each receiving device 180, 182, 184, 186 may receive data packets from other sources as well (e.g., a central processor (not shown), SUs 26 (FIG. 1), SCS 28 (FIG. 1), etc.).

Each transmitting device 170, 172, 174, 176 is primarily dedicated to sending data packets ("outgoing data packets") across the cross-links. Each processor 190, 192, 194, 196 is coupled to each transmitting device 170, 172, 174, 176 as shown in FIG. 3. For example, fore processor 190 is coupled to transmitting devices 170, 172, 174, 176. This coupling enables a port computer 160, 162, 164, 166 to send a data packet received by a particular receiving device 180, 182, 184, 186 to an appropriate transmitting device 170, 172, 174, 176 for further routing to another communication node.

In a preferred embodiment, each processor 190, 192, 194, 196 is capable of determining whether the communication link it supports has failed. In an alternate embodiment, each processor 190, 192, 194, 196 is coupled to a failed link detection device (not shown) that determines that a link has failed and reports the link failure to the processor 190, 192, 194, 196.

Each processor 190, 192, 194, 196 is also desirably coupled to a central processor (not shown) or a centralized switch that sends data packets to the processors 190, 192, 194, 196 from sources other than cross-links. For example, data packets may be generated internally (e.g., by the central processor) which contain telemetry information. Additionally, data packets are received from SUs 26 (FIG. 1) and from other ground-based equipment such as SCS 28 (FIG. 1). In an alternate embodiment, these data packets from other sources may be received by one or more port computers and routed according to its associated port routing table. Inputs 200–211 represent inputs from sources other than receiving devices 180, 182, 184, 186. Any number of inputs 200–211 may be used as required by the particular system configuration.

Figure 4:
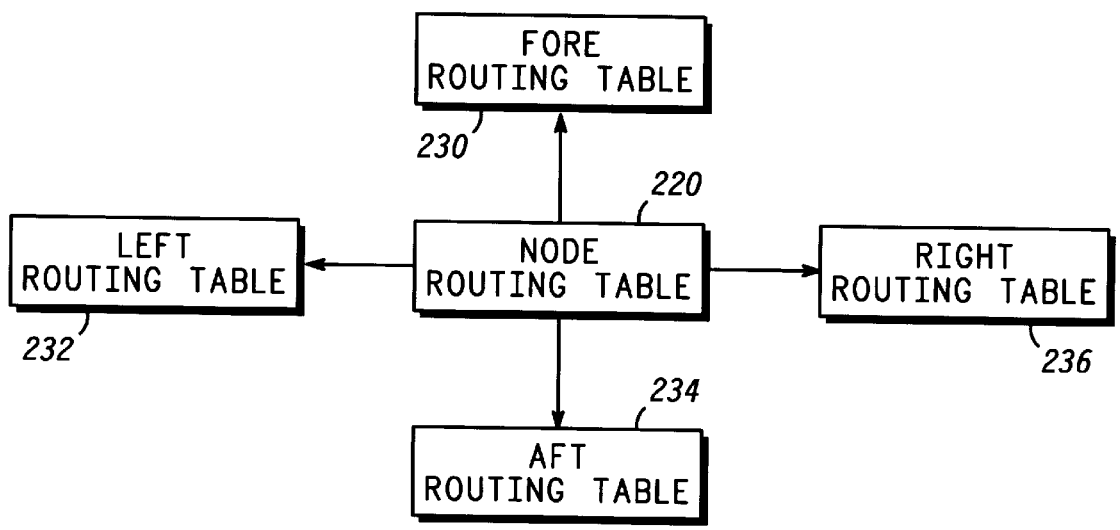
FIG. 4 illustrates a routing table configuration in accordance with a preferred embodiment of the present invention.

In a preferred embodiment, each port contains a "port routing table" or "port table" which is used by each processor 190, 192, 194, 196 to determine to which transmitting device 170, 172, 174, 176 a particular data packet should be sent. In a preferred embodiment, port routing tables are stored in memory devices (not shown) coupled to the processors 190, 192, 194, 196. In an alternate embodiment, port routing tables may be stored in a memory device internal to the processor. FIG. 4 illustrates a routing table configuration in accordance with a preferred embodiment of the present invention. A "node routing table" 220 is used to update port routing tables 230, 232, 234, 236 and to control routing of data packets from sources other than cross-links.

In a preferred embodiment, four port routing tables exist: fore routing table 230, left routing table 232, aft routing table 234, and right routing table 236. It is obvious to one of skill in the art based on the description that more or fewer port routing tables may exist. Desirably, one routing table exists for each port. However, this is not a necessary limitation. For example, in an alternate embodiment, a single routing table may be accessed by all ports.

In a preferred embodiment, routing table "update commands" are received from SCS 28 (FIG. 1) on a periodic or a periodic basis. The update commands contain information necessary to update or replace one or more entries of node routing table 220 and/or port routing tables 230, 232, 234, 236. An update command may replace one or more entries up to an entire routing table. Use of update commands that replace only one or a few entries is desirable to minimize bandwidth, memory, and/or update time because, in general, not every entry in a routing table will change from one update to the next. In a preferred embodiment, each update command has an "update time" associated therewith. The update time indicates the time when a new routing table entry (or entries) associated with the update command should replace an old routing table entry in the node routing table 220 and/or port routing tables 230, 232, 234, 236. In an alternate embodiment, each update command may be used to modify the routing tables upon receipt by the node. Terminology used in this description that describes new update commands as being "received" means either that the commands are actually received by the communication node, or that the "update time" of the command has arrived and it is time to update the table entry or entries associated with the update command.

In a preferred embodiment, after an update command is received, a central processor (not shown) updates the node routing table and distributes the changed routing entries to their respective ports. In an alternate embodiment, each node receives update commands and updates their node routing tables directly.

Figures 5, 6:
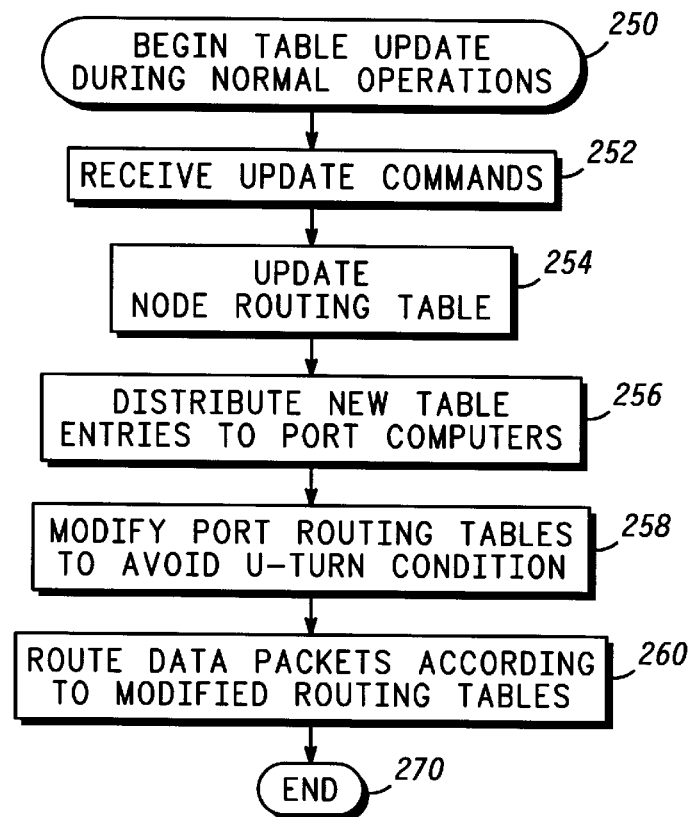
FIG. 5 illustrates a method for a communication node to update the node's routing tables during normal operations in accordance with a preferred embodiment of the present invention.
FIG. 6 illustrates an exemplary node routing table in accordance with a preferred embodiment of the present invention.

FIG. 5 illustrates a method for a communication node to update the node's routing tables during normal operations in accordance with a preferred embodiment of the present invention. The method begins 250 in step 252, when one or more update table commands are received by a communication node. The update table commands are used in step 254 to update the node routing table. New routing table entries are distributed to the appropriate port computers in step 256. In an alternate embodiment, the update commands are sent directly to the relevant port, and the port directly updates its port routing table. In step 258, each port uses "alternative tables" (e.g., ALT-1 292, and ALT-2 294, FIG. 6) to modify the new port table entries to avoid potential U-turn conditions (or "loopback conditions"). A "U-turn condition" occurs when a port sends out a data packet through the same port it was received over. As described above, U-turn conditions may result in the problem of continuous recirculation. Modification of the table entries to avoid potential U-turn conditions is described more fully in conjunction with FIGS. 6–7. In alternate embodiments, the central processor (not shown) or the SCS 28 (FIG. 1) may modify the update commands to avoid a U-turn condition before sending the update commands to the ports. The communication node then routes data packets in accordance with the modified routing table in step 260. Routing of data packets may occur simultaneously with the other steps of the method. The method then ends in step 270.

FIG. 6 illustrates an exemplary node routing table 280 in accordance with a preferred embodiment of the present invention. Node routing table 280 has columns DN-ID 282, FORE 284, AFT 286, LEFT 288, RIGHT 290, ALT-1 292, and ALT-2 294. In a preferred embodiment, a port routing table is similar to node routing table 280, except that each port routing table would have only one of the FORE 284, AFT 286, LEFT 288, or RIGHT 290 columns. Each port table would desirably have both the ALT-1 292 and ALT-2 294 columns. FIG. 6 illustrates a single "page" of a routing table, which represents one routing scheme alternative. It would be obvious to one of skill in the art based on the description that the node routing table and the port routing tables may have multiple pages which allow packet load balancing based on packet type or other packet-unique criteria.

As previously described, a DN-ID is desirably associated with each possible destination in the communication system. It would be obvious to one of skill in the art based on the description that any number of DN-IDs may be used for a particular communication system. Each data packet indicates its intended destination using a DN-ID which is correlated to a routing table to determine where to route the data packet.

The FORE 284, AFT 286, LEFT 288, and RIGHT 290 columns contain routing information used to route data packets received by each of those ports. Each entry in the FORE 284, AFT 286, LEFT 288, and RIGHT 290 columns indicates to which port a data packet having a particular DN-ID should be sent for further routing. In a preferred embodiment, each entry in the FORE 284, AFT 286, LEFT 288, and RIGHT 290 columns is initially the same for a particular DN-ID (with necessary modifications as described below). In alternate embodiments, these entries may vary for the different columns. Therefore, as exemplified in FIG. 6, a data packet received by the FORE port and having a DN-ID of "1" would be sent to the left ("L") port for further routing. Referring to FIG. 3, a data packet with DN-ID of "1" that is received by fore receiving device 180 would be evaluated by fore processor 190 and would be sent to left transmitting device 172. Data packets destined for the routing node that received the data packet are desirably routed to a central processor. As would be obvious to one of skill in the art based on the description, the entries in FIG. 6 are for the purposes of illustration only.

The ALT-1 292 and ALT-2 294 columns represent "alternative table" entries that are used to replace table entries in the FORE 284, AFT 286, LEFT 288, and RIGHT 290 columns when the original entries result in a "U-turn condition" or when a link failure is detected. For each DN-ID, entries in the ALT-1 292 and ALT-2 294 columns must be different from each other. More or fewer alternative table columns may be used. For example, in an alternate embodiment, each port may have one or more alternative tables which differ from the alternative tables of other ports. This alternative is not preferred, however, because more bandwidth, memory, and/or time would be required to modify the multiple, different alternative tables.

FIG. 7 exemplifies a "consolidated" port routing table 300 after modification to avoid potential U-turn conditions in accordance with a preferred embodiment of the present invention. Consolidated port routing table 300 contains the columns DN-ID 302, FORE 304, AFT 306, LEFT 308, RIGHT 310, ALT-1 312, and ALT-2 314. Although each port table desirably has only one of the FORE 304, AFT 306, LEFT, 308, and RIGHT 310 columns, all four columns are shown for the purposes of illustration. In describing how a table is modified to avoid potential U-turn conditions, both FIG. 6 and FIG. 7 are used for exemplary purposes. FIG. 6 represents original entries in a port routing table, and FIG. 7 represents the modified entries.

For each particular port, the table entries in the unmodified table 280 (FIG. 6) are evaluated to determine whether the port would be receiving a data packet and sending it out the same port. For example, referring to the original routing configuration in FIG. 6, in FORE column 284, a data packet with DN-ID of "3" would be sent to the fore ("F") transmission device. This would result in a U-turn condition. Thus, a U-turn condition results whenever the table entry matches the column heading. As shown in FIG. 6, such potential U-turn conditions are present for each port in table 280.

Table 300 (FIG. 7) illustrates a modified routing table after all potential U-turn conditions have been eliminated from table 280 (FIG. 6). To eliminate a potential U-turn condition, the port processor (or the central processor or SCS 28 (FIG. 1)) replaces each U-turn entry with the entry in the ALT-1 column 292 (FIG. 6). If the port processor determines that the ALT-1 replacement entry would also result in a U-turn condition, the entry in the ALT-2 column 294 (FIG. 6) is used. Two examples will clarify this concept. In a first example, the table entry in the FORE column 284 (FIG. 6) associated with a DN-ID of "3" is originally "F". This entry is replaced by "L", the corresponding entry in the ALT-1 column 292 (FIG. 6). Because "L" would not result in a U-turn condition, this entry is acceptable. In a second example, the table entry in the LEFT column 288 (FIG. 6) associated with a DN-ID of "1" is originally "L". This entry is first replaced by "L", the corresponding entry in the ALT-1 column 292 (FIG. 6). Because "L" still results in a potential U-turn condition, the entry is replaced with "A", the corresponding entry in the ALT-2 column 294 (FIG. 6). Because "A" would not result in a U-turn condition, the entry is acceptable. It would be obvious to one of skill in the art based on the description that the entry would not have to be actually replaced with the entry in ALT-1 column 292 (FIG. 6) if it is determined that the entry in ALT-1 column 292 (FIG. 6) is unacceptable. As would be obvious to one of skill in the art based on the description, the entries in FIG. 7 are for the purposes of illustration only. FIG. 7 reflects all modified entries in bolded boxes. As used herein, U-turn avoidance is "activated" when a node's routing tables contain no potential U-turn conditions.

Figure 8:
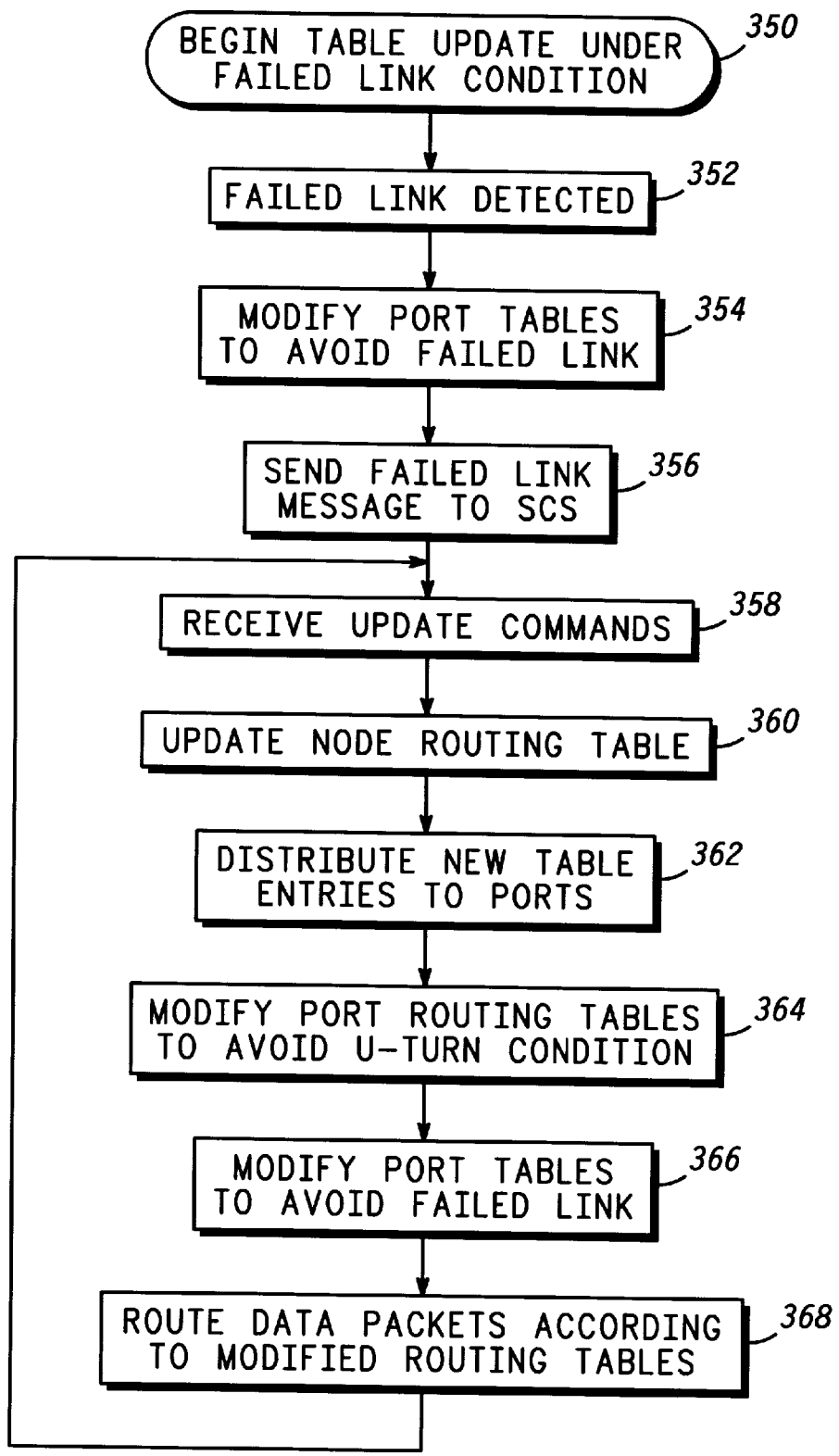
FIG. 8 illustrates a method for a communication node to update tables under the condition of a failed link in accordance with a preferred embodiment of the present invention.

FIG. 8 illustrates a method for a communication node to update tables under the condition of a failed link in accordance with a preferred embodiment of the present invention. The method begins 350 in step 352 when a failed link is detected by a node (a failed-link node). A failed link may be detected, for example, when initial link acquisition is not made, or when an acquired link loses lock. For example, in a system using RF links, a node that had acquired an RF link may detect that the RF signal from another node has dropped to an unacceptable level. When a failed link is detected, the failed link is reported to each port computer (e.g., the central processor indicates which port has failed and/or gives each port computer instructions on how to deal with the failure).

Next, step 354 modifies the port tables of each active port to avoid the failed link. The alternative tables (e.g., ALT-1 292 and ALT-2 294, FIG. 6) are desirably used to modify the table entries. In a preferred embodiment, modification may deactivate U-turn avoidance. Continuous recirculation should nonetheless be avoided because, although the data packet is sent back to the sending node (i.e., the origin of the data packet), the sending node should still have its U-turn avoidance activated. Thus, the sending node will not return the data packet to the failed-link node. Modification to avoid a failed link is described in more detail in conjunction with FIG. 8.

After step 354, a "failed link message" is desirably sent in step 356 to SCS 28 (FIG. 1), so that the system may respond completely to the detected failure. In an alternate embodiment, SCS 28 (FIG. 1) may receive notification of the failed node from a source other than the failed link node. As would be obvious to one of skill in the art based on the description, steps 354 and 356 may be performed in reverse order.

New update table commands are received by the nodes in step 358. The new update commands may or may not reflect a system response to the failed link, depending on whether the SCS 28 (FIG. 1) has had time to respond to the failure notification or not. The update table commands are used in step 360 to update the node routing table. New routing table entries are distributed to the appropriate ports in step 362. In an alternate embodiment, the update commands are sent directly to the relevant port, and the port directly updates its port routing table. In step 364, each port uses alternative tables (e.g., ALT-1 292, and ALT-2 294, FIG. 5) to modify the new port table entries to avoid potential U-turn conditions. Modification of the table entries to avoid potential U-turn conditions is described more fully in conjunction with FIGS. 5–7. If necessary, the tables are modified again in step 366 to avoid the failed link as described in conjunction with FIGS. 8–9. In alternate embodiments, the central processor (not shown) or the SCS 28 (FIG. 1) may modify the update commands to avoid a U-turn condition and/or to avoid the failed link before sending the update commands to the ports. The communication node then routes data packets in accordance with the modified routing table in step 368. Routing of data packets occurs simultaneously with the other steps of the method.

The method then iterates as shown in FIG. 8. This method desirably stays in effect until a recovery event occurs: either the failed link is recovered or the SCS 28 (FIG. 1) commands the communication node to revert to normal operations or makes a response that makes the steps of the method unnecessary.

FIG. 9 exemplifies a consolidated port routing table 380 after modification of port routing table 300 (FIG. 7) to respond to a failed link in accordance with a preferred embodiment of the present invention. Consolidated port routing table 380 contains the columns DN-ID 382, FORE 384, AFT 386, LEFT 388, RIGHT 390, ALT-1 392, and ALT-2 394. In describing how a table is modified to respond to a failed link, both FIG. 7 and FIG. 9 are used for exemplary purposes. FIG. 7 will represent entries in a port routing table 300 (FIG. 7) that has U-turn avoidance activated (referred to as the "operational table" 300), and FIG. 9 will represent the entries modified to avoid a failed link. As would be obvious to one of skill in the art based on the description, the entries in FIG. 9 are for the purposes of illustration only.

Table 380 (FIG. 9) illustrates a modified routing table after all entries have been modified to avoid a failed link. To eliminate entries that use the failed link, each port evaluates each port table entry to determine whether the port would be sending data to the port associated with the failed link. The port processor (or the central processor or SCS 28 (FIG. 1)) replaces each failed link entry in table 300 (FIG. 7) with the entry in the ALT-1 column 312 (FIG. 7). If the ALT-1 replacement entry would also use the failed link, the entry in the ALT-2 column 314 (FIG. 7) is used. An example will clarify this concept. Assume that the node detects a failed link associated with the fore port The port routing tables are to be modified accordingly using the ALT-1 312 (FIG. 7) or ALT-2 314 column entries. The FORE column 384 is shown with "X" or "don't care" entries because this is the failed link. For example, as shown in FIG. 7, the LEFT 308 column's entry associated with a DN-ID of "8" is "F" (the failed node). This entry is first modified using the corresponding ALT-1 312 (FIG. 7) entry of "F". However, because the fore port is the failed link, the entry "R" from ALT-2 314 (FIG. 7) is used instead. The modification of the entry to "R" avoids sending data packets to the failed fore port. Thus, the modification is acceptable. It would be obvious to one of skill in the art based on the description that the entry would not have to be actually replaced with the entry in ALT-1 column 312 (FIG. 7) if it is determined that the entry in ALT-1 column 312 (FIG. 7) is unacceptable. FIG. 9 reflects all modified entries in bolded boxes.

It would be obvious to one of skill in the art based on the description that a link failure may not prohibit communications in both directions across the failed link. For example, a port's receiving device may become inoperable, but its transmission device may still be capable of functioning. In such a case, it would be unnecessary to modify the port routing tables. If, however, a port's transmission device becomes inoperable, it would be necessary to modify the other ports' routing tables to avoid the inoperable port's transmission device, but the port with the inoperable transmission device should retain its original routing table so that it may still route data packets it receives.

Figure 10:
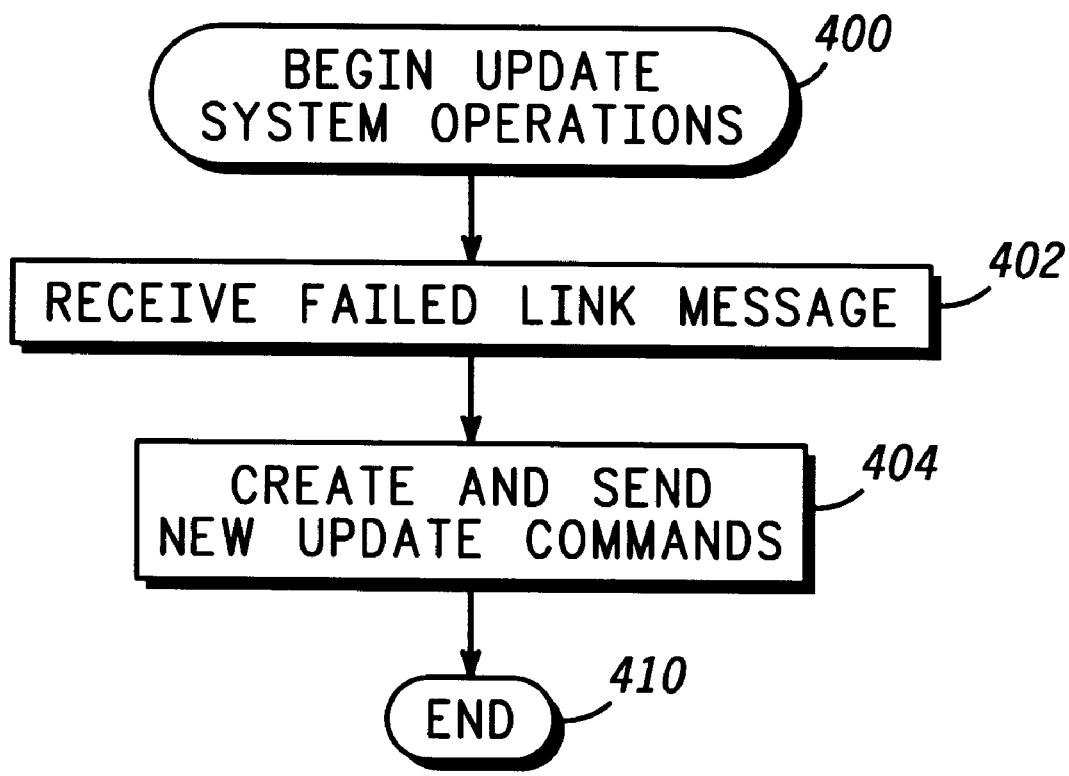
FIG. 10 illustrates a method for a control facility to update system operations after a link failure occurs, in accordance with a preferred embodiment of the present invention.

FIG. 10 illustrates a method for a control facility to update system operations after a link failure occurs, in accordance with a preferred embodiment of the present invention. The method begins 400 when a failed link message is received by the SCS 28 (FIG. 1) in step 402. In a preferred embodiment, the failed link message originated from a failed link node, as described in FIG. 8, step 356. It would be obvious to one of skill in the art based on the description that notification of a failed link may be otherwise obtained. In step 404, SCS 28 (FIG. 1) then creates update table commands that compensate for the failed link. SCS 28 (FIG. 1) then sends the update table commands to some or al of the affected nodes. The method then ends in step 410.

In an alternate embodiment, SCS 28 may precompute and store alternative tables that may be rapidly sent to the nodes when SCS 28 receives a failed link message. In this embodiment, nodes would not need to store alternative tables. Alternative tables would desirably be computed for each possibility of a failed link for each node.

In summary, a method and apparatus have been described for adjusting routing in response to a failed link, wherein the method and apparatus reduce the number of dropped packets and reduce the number of packets which would experience recirculation.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. In particular, while a preferred embodiment has been described in terms of a satellite communication system, the method and apparatus of the present invention may be utilized for any type of communication system having multiple nodes that utilize multiple communication links between them.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for controlling message routing through a communication system, the communication system comprising multiple nodes which communicate through communication links, the method comprising the steps of:

a) routing, by a node, data packets received from sending nodes in accordance with at least one current routing table accessible by a receiving port of the node, wherein the at least one current routing table is used to determine to which transmitting port of the node the data packets should be sent;

b) determining, for each entry of the at least one current routing table, whether a routing command included in the entry will cause the receiving port to route a data packet directly back to a sending node which sent the data packet;

c) performing modifications to those entries of the at least one current routing table which would cause the receiving port to route the data packet directly back to the sending node, where the modifications will cause the receiving port not to route the data packet directly back to a sending node, the modifications resulting in at least one modified routing table;

d) receiving the data packet from the sending node by the receiving port; and e) routing the data packet according to the at least one modified routing table.

2. The method as claimed in claim 1, wherein at least one alternative routing table is accessible to the node, and step b) comprises the steps of:

b1) locating an entry in the at least one current routing table that would cause the receiving port to route the data packet directly back to the sending node; and b2) replacing the entry with an alternate entry in the at least one alternative routing table that would not cause the receiving port to route the data packet directly back to the sending node.

3. The method as claimed in claim 1, wherein the at least one current routing table comprises a node routing table and multiple port routing tables, and step b) comprises the steps of:

b1) performing modifications to node routing table entries so that the receiving port will not route the data packet directly back to the sending node, resulting in modified entries;

b2) sending the modified entries to the multiple port routing tables; and b3) changing port routing table entries according to the modified entries.

4. The method as claimed in claim 1, wherein the node has multiple ports, each of the multiple ports supports a communication link, each of the multiple ports accesses a separate port routing table, and step b) comprises the step of performing the modifications, by each of the multiple ports, to the entries in the separate port routing table, resulting in a modified routing table for each of the multiple ports.

5. The method as claimed in claim 4, further comprising the step of changing the separate port routing table according to at least one update command which instructs the node to alter the separate port routing table.

6. The method as claimed in claim 1, further comprising the step of changing the at least one current routing table according to at least one update command which instructs the node to alter the at least one current routing table.

7. The method as claimed in claim 6, further comprising the step of receiving the at least one update command from a control facility prior to the changing step.

8. A method for controlling message routing through a communication system, the communication system comprising multiple nodes which communicate through communication links, the method comprising the steps of:

a) routing, by a receiving port of a node, data packets in accordance with at least one current routing table accessible by the receiving port, wherein routing the data packets involves determining, based on the at least one current routing table, to which transmitting port of the node the data packets should be sent;

b) executing at least one update command comprising information required for the node to change one or more entries of the at least one current routing table, the information having been created after making a determination, for each entry of the one or more entries, whether a routing command included in the entry will cause the receiving port to route a data packet directly back to a sending node which sent the data packet;

c) changing the one or more entries in the at least one current routing table according to the at least one update command so that the one or more entries, once changed, will cause the receiving port not to route the data packet directly back to the sending node, resulting in at least one modified routing table; and d) routing the data packets according to the at least one modified routing table.

9. A routing apparatus for routing data packets through a communication system, the routing apparatus comprising:

a central processor for controlling routing of incoming data packets received by and outgoing data packets sent by the routing apparatus, and for determining, for entries within a node routing table, whether a routing command included in each of the entries will cause the node to route the incoming data packets directly back to a sending node that sent the incoming data packets, and for modifying the entries so that the entries will cause the receiving port not to route the data packets directly back to the sending node, and for further modifying the node routing table to avoid a failed communication link, wherein the node routing table originated from a control facility;

at least one port, coupled to the central processor, wherein when a port is functioning as a receiving port which receives the incoming data packets, the port uses the node routing table to determine to which transmitting port to send the incoming data packets, a port supporting a communication link and including:

a port processor for controlling a receiving device and a transmitting device;

the receiving device, coupled to the port processor, for receiving the incoming data packets from the communication link; and the transmitting device, coupled to the port processor, for sending the outgoing data packets across the communication link.

10. A routing apparatus for routing data packets through a communication system, the routing apparatus comprising:

a memory device for storing a port routing table which originated from a control facility; and at least one port, wherein a port of the at least one port is coupled to the memory device and supports a communication link and has a processor for controlling routing of incoming data packets received by and outgoing data packets sent by the port, and for determining, for entries within the port routing table, whether a routing command included in each of the entries will cause the receiving port to route a data packet directly back to a sending node which sent the data packet, and for modifying the entries so that the entries will cause the receiving port not to route the data packet directly back to the sending node, a receiving device, coupled to the processor, for receiving the incoming data packets from the communication link, and a transmitting device, coupled to the processor, for sending the outgoing data packets across the communication link.

11. The routing apparatus as claimed in claim 10, further comprising a central processor, coupled to the port, for controlling modifications to the port routing table.

12. The routing apparatus as claimed in claim 10, wherein the port further comprises a memory device, coupled to the processor, for storing the port routing table.

* * * * *